Oct. 12, 1971    J. R. BUTA    3,611,780
THRUST BEARING MOUNTING ARRANGEMENT
Filed June 10, 1969    2 Sheets-Sheet 2

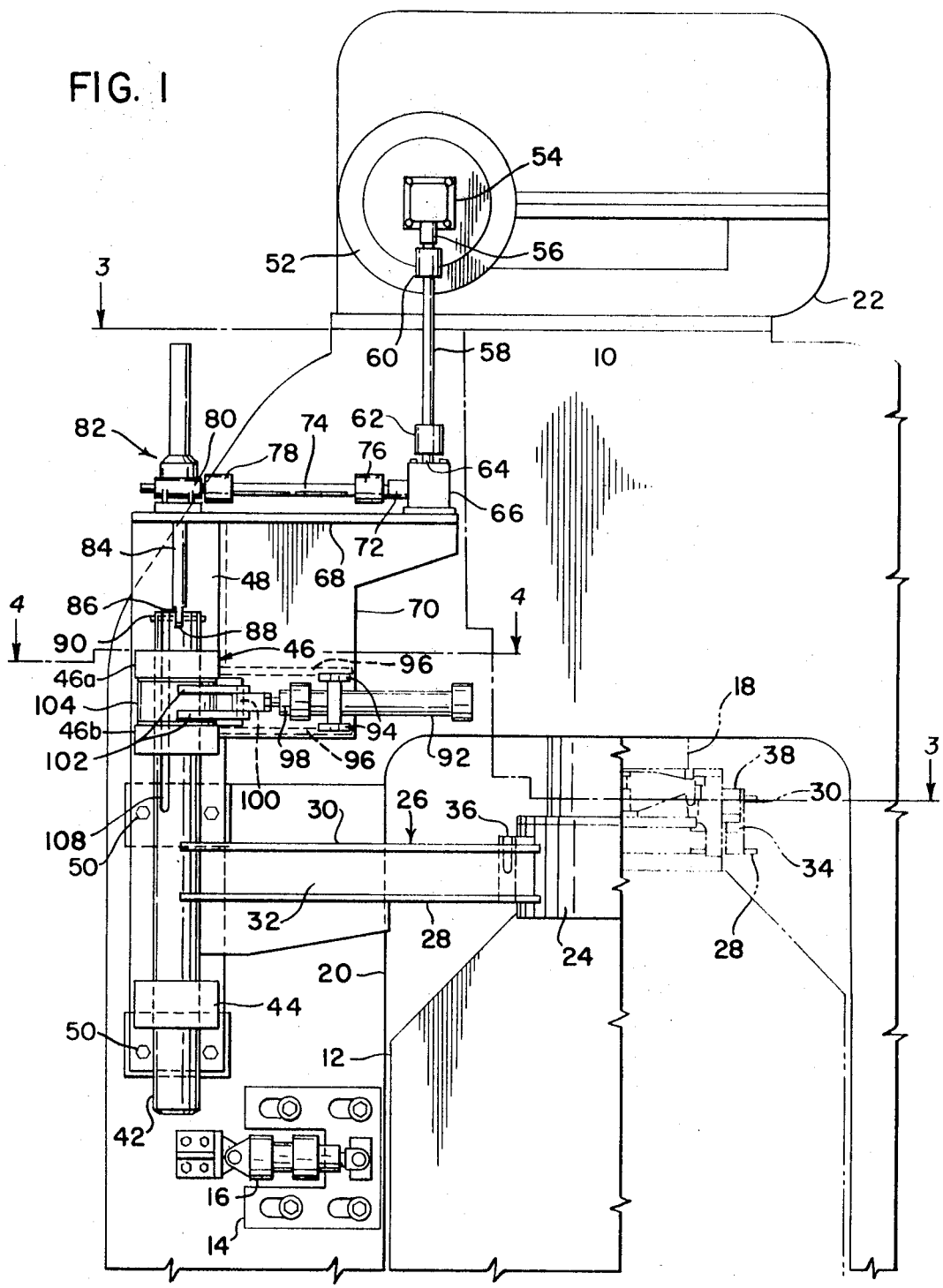

INVENTOR.
JOHN ROSARIO BUTA

BY
Meyer, Tilberry & Body
ATTORNEYS

3,611,780
THRUST BEARING MOUNTING ARRANGEMENT
John Rosario Buta, Salem, Ohio, assignor to Gulf + Western Industrial Products Company, Grand Rapids, Mich.
Filed June 10, 1969, Ser. No. 831,977
Int. Cl. B21b 31/24
U.S. Cl. 72—248                                        9 Claims

ABSTRACT OF THE DISCLOSURE

An apparatus particularly suited for facilitating removal of thrust bearings from between the screw-down screws and bearing chocks of a rolling mill. The apparatus described comprises horizontally swingable frames which carry the thrust bearings. The frames are also arranged for vertical movement and are connected through mechanical drive trains with the drive for the screws. The drive trains function to move the frames vertically with the screws to maintain the frames at the proper location for bearing removal.

---

The present invention is directed toward the bearing art and, more particularly, to an improved thrust bearing mounting arrangement.

The invention is especially suited for use in rolling mills and will be described with particular reference thereto; however, it will be appreciated the invention is capable of broader application and could be used in other types of machinery.

Nearly all conventional rolling mills comprise a vertically extending frame in which the rolls are mounted. The rolls are carried in chocks mounted for sliding vertical movement in the frame. Large diameter screw-down screws extend downwardly through the top of the frame to apply the necessary rolling forces through the chocks to the rolls. Positioned between the screws and the chocks are large diameter thrust bearing assemblies or "cartridges" which function to compensate for misalignment between the ends of the screws and the tops of the chocks, while permitting free rotation of the screws relative to the chocks. Additionally, the cartridges often include means for measuring the forces being applied to the rolls.

It is frequently necessary to remove the cartridges both for maintenance and to provide sufficient clearance above the chocks for roll changing operations. Many types of cartridge mounting and removing frames and structures have been provided for performing this function. For example, frames extending through the mill and resting on the upper roll chocks have been utilized. This arrangement was unsatisfactory because during the cartridge removal operation, the frames had to be lifted away from the chocks by separate hoisting mechanisms. This increased the time required for changing and, additionally, the structure required was somewhat complex and costly. Alternately, apparatus was provided wherein the frames were suspended directly from the screws or supported on fluid cylinders. These arrangements were somewhat more desirable because the frame was always in position for roll removal; however, they did have certain disadvantages. For example, when the frame was directly supported from the chocks a special bearing construction was normally required. Additionally, there was the possibility that malfunction of the screw-down control would cause one screw to be raised further than the other and twist the frame. Although the fluid cylinder support did not have these drawbacks, any fluid leakage caused the frame to move slightly out of position.

The present invention provides an arrangement wherein the above-noted and other problems are overcome. In particular, according to the present invention, the cartridge is carried on a support frame arranged for guided vertical movement with the screw-down screw, and a mechanical drive train extends between the screw drive means and the frame. The drive train is continuously operable with the screw drive means and arranged to move the frame simultaneously with, and in the same direction as, the screws. Consequently, the frame and cartridges are always maintained in the proper position relative to the screws. Further, when the screws are moved up to the position for roll removal, the frame is in the position required for cartridge removal.

In accordance with a more limited aspect of the invention, the frame is pivotally mounted for movement between a first position wherein the cartridge is aligned with the screw to a second position outwardly of the mill frame wherein it can be removed from the support frame. Also, power means are provided for selectively moving the support frame between the first and second positions.

Accordingly, the primary object of the invention is the provision of an improved thrust bearing support arrangement which facilitates bearing removal.

Another object is the provision of a thrust bearing support arrangement wherein the support moves with the bearing and can move the bearing laterally.

Yet another object is the provision of a thrust bearing support assembly especially suited for rolling mills and provided with means for moving the entire assembly out of the mill.

A further object is the provision of a support of the type described which is simple to construct and operate.

These and other objects and advantages will become apparent from the following description when read in conjunction with the accompanying drawings wherein:

FIG. 1 is a top end elevation of a conventional 4-high mill stand provided with a bearing support and removal assembly formed in accordance with a preferred embodiment of the subject invention.

Figure 4:
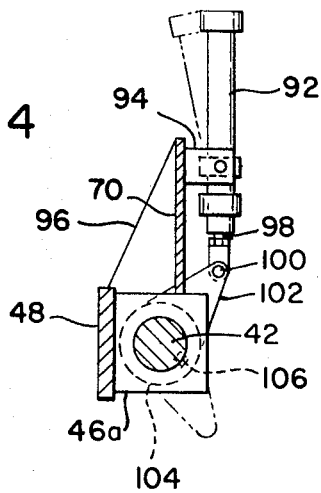
Figure 2:
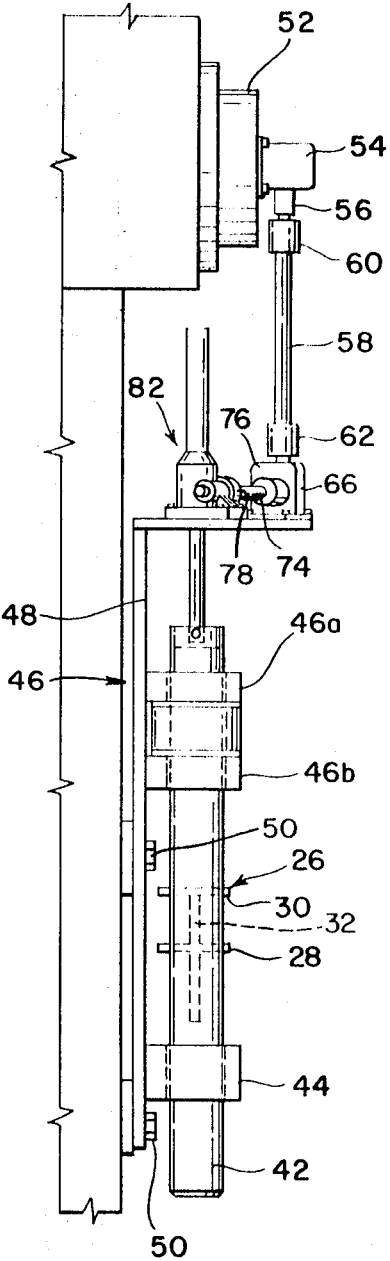
FIG. 2 is a view partial side view of the apparatus shown in FIG. 1.

Referring more particular to FIG. 1 of the drawings, it will be noted that the figure shows the top or upper portion of a relatively conventional 4-high mill stand. The details of the stand form no part of the subject invention; however, the stand comprises the usual vertically extending frame 10 having an access window 20 in which the various roll chocks are mounted for vertical sliding movement. It should be understood that the side of the mill opposite that shown in FIG. 1 is constructed in basically the same manner.

In FIG. 1a of the upper back-up roll chock 12 is shown. As is customary, the chock 12 is provided with a removable retainer plate 14 arranged to be actuated inwardly against the roll chock by an hydraulic cylinder 16. The retainer plate 14 engages a vertically extending groove on the chock 12 to permit the chock to have free vertical movement while being retained in the proper horizontal position.

Extending downwardly through the frame 10 is the usual screw-down screw 18. The screw is driven from a large diameter worm gear carried in a drive housing 22 mounted at the top of frame 10. The structure thus far described is conventional and is shown, for example, in the commonly assigned U.S. patent application Ser. No. 793,783, filed Jan. 24, 1969, which is incorporated herein by reference.

As is customary, positioned between the lower end of each screw-down screw 18 and the top surface of the associated chock 12 is a thrust bearing cartridge 24. These thrust bearing cartridges can take many forms and usually include tapered roller bearings positioned between an upper member which engages the lower surface of the screw-down screw and the lower housing portion which rest against the backup roll chock. The cartridges also often include means for measuring the forces transmitted to the chocks from the screws.

Figure 3:
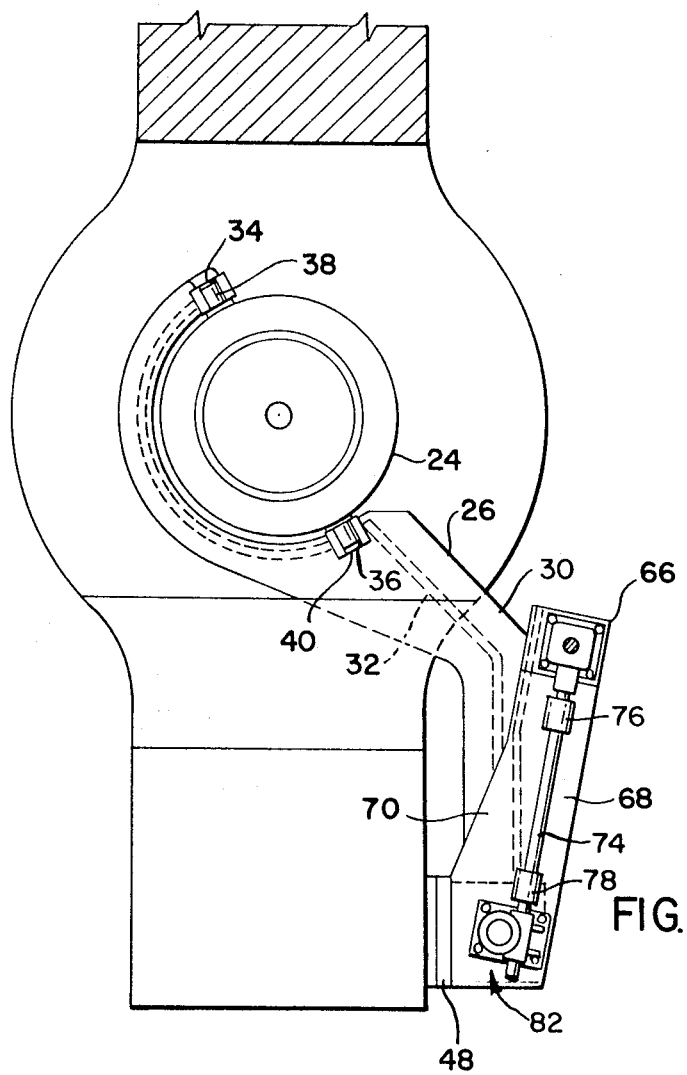
FIG. 3 is a cross-sectional view taken on line 3—3 of FIG. 1 and showing the bearing support arm and a portion of the drive train used to raise and lower the support arm; and, FIG. 4 is a cross-sectional view taken on line 4—4 of FIG. 1 and showing in detail the mechanism used to rotate the support arm to remove the thrust bearing from the mill.

According to the subject invention, the thrust bearing cartridge 24 is arranged to be moved laterally from between the screw-down screw and the chock to a position outside the mill. This is necessary in order to provide proper clearance for roll removal and also, to permit bearing cartridges to be replaced and the required maintenance performed. The preferred bearing support and removal apparatus provided includes a support arm 26 which, as best shown in FIGS. 1 and 3, is formed by spaced plates 28 and 30 connected by a web section 32. The outer end portion of the arm 26 is curved as shown in FIG. 3 and adapted to relatively closely receive the cartridge 24. It will be noted that vertical slots 34, 36, are formed by U-shaped support members welded to the arm 26. These slots are adapted to slidably receive respective outwardly extending ears or tabs 38 and 40 connected on diagonally opposite sides of the cartridge 24. This arrangement permits the cartridge 24 to have some freedom of movement in the vertical direction relative to the arm 26.

The outer end of the arm 26 is welded to a vertically extending shaft or support member 42. The shaft 42 is carried in a set of support blocks 44, 46 which are welded or otherwise positively connected to a vertically extending plate member 48. The plate member 48 is, in turn, connected to the vertical face of the mill frame 10 by machine screws 50. Referring to FIG. 1, it will be noted that the machine screws 50 pass through elongated openings formed in the vertical plate 48. This permits the lateral positioning of the plate to be shifted slightly for fine adjustment of the support arm 26.

As will be noted, the vertically extending shaft 42 passes through aligned openings formed in the brackets or support blocks 44, 46. Additionally, bracket 46 includes two outwardly extending portions 46a and 46b. The support shaft 42 is freely slidable and rotatable in the brackets 44, 46 so that it can be freely moved in a vertical direction as well as rotated to swing the arm 26 outwardly of the mill.

According to the invention, the arm is directly mechanically connected with the rolling mill screw-down screw drive train so that as the screw-down screw is moved vertically the arm 26 partakes of corresponding movement, simultaneously, and in the same direction. Many types of drive mechanisms could be used for providing the required motion of arm 26; however, in the preferred embodiment, the drive connection comprises a rotatable drive train extending between the worm which drives the main worm gear in housing 22, and the shaft 42. Although not shown in detail, the worm extends perpendicularly of the screw-down screw 18 axis and is carried in a housing 52 connected with housing 22. At the outermost end of the worm there is connected a conventional right-angle gear drive unit 54. The output shaft 56 from the right-angle gear drive 54 is connected through suitable shafting 58 and couplings 60, 62 with the input shaft 64 of a second right-angle drive 66. As shown in FIGS. 1 and 3, the right-angle gear drive 66 is carried on a support plate 68 which extends horizontally outwardly from the plate 48. The support plate 68 is, additionally, supported by an angle-plate or bracket 70. The output shaft 72 of the right-angle drive 66 is connected through shafting 74 and couplings 76, 78 with the input shaft 80 of a conventional screw-jack 82.

As will be noted, screw-jack 82 is also carried on the horizontally extending plate 68 and is positioned so that its output shaft 84 extends vertically downwardly in alignment with the shaft 42. The shaft 84 has flats 86 formed on its lower end. The flats 86 engage a corresponding slot 88 formed in the upper-end of shaft 42. A pin 90 passes through the upper end of the shaft 42 and engages an opening formed in the flats of shaft 84. Preferably, the pin 90 is arranged to provide a releasable connection between the shaft 84 and shaft 42.

As can be appreciated, the gear ratios between the worm and the output shaft 84 of the screw-jack 82 are chosen such that the movement transmitted to the shaft 42 is identical to the movement of the screw 18. Consequently, the arm 26 is caused to move simultaneously with screw 18 and in the same direction and at the same speed. Thus, the arm 26 is always properly located relative to the thrust bearing 24 so that the thrust bearing can be easily removed at any time.

During removal the force between the screw-down screw 18 and the thrust bearing 24 must be removed. For this reason, as best shown in the right-hand portion of FIG. 1, a clearance is provided between the lower edges of the ears 38, 40 and the bottom of the respective grooves 34, 36. This spacing is designed into the arrangement so that when the screw 18 is backed up to release the pressure the final upward movement of the screw causes its lower surface to be spaced from the top of the bearing block at the time the ears engage the bottom of the grooves 34, 36.

A variety of types of drive means could be provided for swinging the arm 26 between the working position shown, and the outwardly directed position for thrust bearing removal. In the embodiment under consideration, the means used for selectively rotating the arm comprises an hydraulic cylinder 92. The cylinder 92 is pivotally connected to a pair of spaced brackets 94 which extend outwardly from the previously mentioned plate 70. Additionally, a pair of angle braces 96 are positioned behind plate 70 and extend into engagement with the main plate 48 and the outwardly extending portions 46a and 46b of the support bracket 46. The piston rod 98 of cylinder 92 is connected through a pivot connection 100 with outwardly extending brackets 102. The brackets 102 are carried on a sleeve 104 which is positioned between portions 46a and 46b of bracket 104. The sleeve 46 has an internal diameter of size to permit free sliding movement of the shaft 42 therethrough; however, as best shown in FIG. 4, a key member 106 is formed internally of the sleeve 104. The key 106 is received in an elongated keyway or groove 108 formed in the shaft 42. Accordingly, the shaft 42 can move freely in a vertical direction relative to the sleeve 104; however, when the cylinder 92 is actuated to the dotted line position shown in FIG. 4, the shaft 42 must, of course, rotate to swing the arm 26 outwardly of the mill As can be appreciated, a subject invention provides for rapid removal of the thrust bearing assembly 24. Additionally, at all times during the adjustment of the screw-down screw the arm or the bearing support frame is in proper position for bearing removal. This is achieved without the necessity for any permanent frame work within the mill or any direct connections between the screw-down screw and the thrust bearing.

Although only one bearing support and removal assembly has been shown and described, it should be understood that a second similar assembly is preferably provided at the opposite side of the stand for removing the other thrust bearing.

The invention has been described in great detail sufficient to enable one of ordinary skill in the bearing art to make and use the same. Obviously, modifications and alterations of the preferred embodiment will occur to others upon reading and understanding of this specification and it is my intention to include all such modifications and alterations as part of my invention insofar as they come within the scope of the appended claims.

Having thus described my invention, I claim:

1. In a machine of the type including a vertically movable thrust producing screw member, first means for vertically moving said screw member to apply a force to an aligned force receiving member and a thrust bearing assembly positioned between said screw member and said force receiving member, the improvement comprising:

means associated with said machine for supporting said thrust bearing assembly in a desired position relative thereto, said support means being mounted for movement between a first position wherein said thrust bearing assembly is disposed between said screw member and said force receiving member and a second position wherein said thrust bearing assembly is disposed remote therefrom; and, second means for vertically moving said support means simultaneously with and in the same direction as said screw member.

2. The improvement as defined in claim 1 including power means for moving said support means and said thrust bearing assembly between said first and second positions.

3. The improvement as defined in claim 1 including means for pivotally mounting said support means for rotation about an axis parallel to the axis of said screw member.

4. The improvement as defined in claim 3 wherein said pivotal mounting means includes means for permitting guided movement of said support means in a direction parallel to said screw member.

5. The improvement as defined in claim 1 wherein said support means includes means for receiving said thrust bearing assembly, said receiving means including means for allowing said thrust bearing assembly to have some freedom of movement relative to said support means in at least one direction parallel to said screw member.

6. An apparatus for supporting a thrust bearing assembly for a machine and moving said thrust bearing assembly between a first position wherein said assembly is disposed between a movable thrust producing screw member and a force receiving member and a second position wherein said assembly is disposed remote therefrom, said apparatus comprising:

means mountable relative to said machine for supporting said thrust bearing assembly in a desired position for movement between said first and second positions and means for moving said support means coextensive with corresponding movement of said movable thrust producing screw member.

7. The apparatus as defined in claim 6 further including power means for moving said support means and said thrust bearing assembly between said first and second positions.

8. The apparatus as defined in claim 6 wherein said support means further includes means for pivotally mounting said support means to said machine and means for receiving said thrust bearing assembly, said receiving means including means for allowing said thrust bearing assembly to have some freedom of movement relative to said support means in at least one direction parallel to said screw member.

9. The apparatus as defined in claim 7 wherein said pivotal mounting means includes means for permitting guided movement of said support means in a direction parallel to said screw member.

References Cited

UNITED STATES PATENTS

| | | | |
|---|---|---|---|
| 2,997,782 | 10/1970 | Eddy | 29—240.5 |
| 1,990,051 | 2/1935 | Schreck | 72—248 |
| 2,853,905 | 9/1958 | Reisacher et al. | 72—248 |
| 2,280,764 | 4/1942 | Stephenson, Jr. | 72—244 |
| 2,525,687 | 10/1950 | Kritscher | 72—244 |
| 2,260,762 | 10/1941 | Yarrington et al. | 72—248 |

CHARLES W. LANHAM, Primary Examiner

M. J. KEENAN, Assistant Examiner

U.S. Cl. X.R.

72—238; 29—256